United States Patent [19]

Lehman

[11] Patent Number: 4,814,752
[45] Date of Patent: Mar. 21, 1989

[54] OVERFLOW WATER CONTAINMENT PEDESTAL WITH HIGH LEVEL SENSOR AND SHUTOFF

[76] Inventor: William L. Lehman, P.O. Box 427, Guilderland, N.Y. 12084

[21] Appl. No.: 121,290

[22] Filed: Nov. 16, 1987

[51] Int. Cl.⁴ ............................................. G08B 21/00
[52] U.S. Cl. .................................. 340/616; 340/623; 200/61.04
[58] Field of Search ............... 340/616, 604, 605, 620, 340/624; 200/61.05, 61.04; 220/1 C, 72

[56] References Cited

U.S. PATENT DOCUMENTS

| | | | |
|---|---|---|---|
| 3,069,671 | 12/1962 | Taylor | 340/616 |
| 3,200,388 | 8/1965 | Uhlig | 340/604 |
| 4,114,644 | 9/1978 | Piper | 220/1 C X |
| 4,380,243 | 4/1983 | Braley | 340/624 X |
| 4,442,969 | 4/1984 | Holden | 220/72 X |
| 4,484,661 | 11/1984 | Everson | 200/1 C X |
| 4,574,977 | 3/1986 | Ellis et al. | 220/1 C X |
| 4,660,734 | 4/1987 | Henney | 220/74 |

Primary Examiner—Joseph A. Orsino, Jr.
Assistant Examiner—Jeffery A. Hofsass
Attorney, Agent, or Firm—Schmeiser, Morelle & Watts

[57] ABSTRACT

A washer-type machine containment pedestal tray having sensor-shutoff device for removing power from the washing machine. The invention provides a pedestal for mounting a washing machine thereon and further, that is capable of containing overflow water should the machine malfunction. The collection of water in the containment pedestal tray actuates a float which in turn trips an electrical switch to remove operative power from the washing machine motor, thus stopping the overflow. Adjunct means are also used on the switch for sounding an audible alarm to operating personnel.

4 Claims, 3 Drawing Sheets

OVERFLOW WATER CONTAINMENT PEDESTAL WITH HIGH LEVEL SENSOR AND SHUTOFF

FIELD OF THE INVENTION

The present invention relates to containments for liquids and, in particular, to containments that are meant to catch liquid overflow from machines and devices which are positioned on or within the containment. Specifically, it deals with containments which have removably attachable mechanisms for alerting operating personnel to high levels of liquid within the containment and for further removing power from the prime mover machinery or water source.

BACKGROUND OF THE INVENTION AND PRIOR ART

Many different apparatus have been devised, the purpose for which is containment of leaking or escaping fluids, mainly water, oil or hydraulic fluids, as well as offering means for warning operating personnel of the escape or potential loss of containment of said fluids. Most often, alerting means comprise a mere visual indication of the height of the fluid level in such containment. Since need has often offered the impetus for invention, the instant inventor, upon observing a problem which occurred in his own home, devised a containment having an adjunct electrical switching system that would prevent the often expensive consequences of having a washing machine of the automatic type overflowing in the home. A most expedient solution to the aforementioned problem was the creation of a washing machine pedestal that served the dual purpose of providing a containment for any water which might overflow and escape the washing machine. A switching device capable of sensing high water level, say from the first ejection of water in a washing sequence, was added to the containment apparatus. Further, the switch would remove power from the prime mover, in most cases a dishwasher or an automatic washing machine.

In order to more fully acquaint himself with the relevant art, the inventor had performed a search of patents and available commercial apparatus. The three main features sought were: (1) a machine pedestal or support which was also; (2) capable of containing significant amounts of water; and (3) means for removal of the water and/or means that would remove the source of overflowing water or deprive that source of power, so that the overflow would cease relatively quickly. Several pieces of prior art were discovered that were considered relevant to the instant invention: U.S. Pat. No. 4,574,977, issued to Ellis et al; U.S. Pat. No. 4,114,644, issued to Piper; U.S. Pat. No. 4,660,734, issued to Heaney et al; U.S. Pat. No. 4,442,969, issued to Holden; and U.S. Pat. No. 4,484,661, issued to Evenson.

A drip tray for highchairs was provided by Ellis that had the purpose of providing essentially a circular formed tray having a peripheral vertically aligned edge for the containment of any liquids that would drop therein. It is interesting to note that Ellis provided not merely a containment for liquids but also a pedestal upon which the liquid source, albeit with intermediate support means, would rest. The tray also contained means for drainage in one of the vertical sides. A user of this invention would, of course, have to provide visual detection of soiling or fill since no other means were afforded by the inventor.

The containment of Piper, a recycling drain pan, was essentially a containment of the Ellis type having automatic means for removal of the liquid (anti-freeze) as well as its reintroduction to the prime source. Because of the recyclable nature of the Piper invention, no warning means or prime mover shut off means were provided with his containment.

Patents issued to Heaney et al, Holden and Evenson for a steam table pan, a reinforced packaging tray, and a drip pan for vehicles, respectively, were studied for the disclosures that they made relating to the parameters of the actual containment device. The Heaney device provided a steam table pan having a reinforcing gusset in the flange corner segment. The instant inventor did not rely upon this technique for reinforcement. Holden discloses a series of pan base designs that are of an integral nature and have the main purpose of rigidifying or stiffening the pan. However, Holden essentially designs a packaging tray and the full spectrum of disclosure does not provide a design of integral reinforcement that would withstand the weight of a modern dishwasher or washing machine. Since it is Evenson's intention to provide a drip pan for vehicles, it goes without saying that the source (an automobile) of the liquid overflow may be postured over the pan, but certainly not within it. Thus, none of the aforementioned patents discloses a containment pedestal for containing overflow fluid from a heavy, ponderous machine. Likewise, none of the prior art discussed discloses means for removing the power from a prime mover or source of fluid overflow.

The problem experienced by the instant inventor, that of containing water overflowing from a modern dishwasher or automatic washing machine and contemporaneously removing the power from the machine (and/or alarming or alerting operating personnel) is hereinafter addressed; and it is for this problem that the instant inventor has provided a workable and inexpensive solution.

SUMMARY OF THE INVENTION

The aforementioned problems have been overcome by providing a multipurpose tray which serves as a pedestal for machines, in the home, that operate by moving significant amounts of water into and out of their washing environs. Concommitantly, this pedestal serves as a containment to capture and hold overflow water that escapes the machine which has malfunctioned. The tray has elevated sides and structural reinforcement, by means of embossed/debossed design, in a generally "X" pattern which is generally centered within the tray's base. Structure and reinforcement are integral and there are no apertures or apparent drains.

An adjunct to the tray, a high water level sensor device is provided which may, by design or selection of the user, be used to alert the machine operator to a high water level condition in the containment and/or remove power from the machine that is mounted thereon and overflowing.

The switch comprises an elongate rod that is set vertically into a float positioned near the base and inside the pedestal, the uppermost portion of the rod actuating a microswitch or lever connected therewith a set of simple breaker points. The float and switch comprise but a part of this unique switching mechanism and serve to transfer interruptable power from an electrical source through the (breakable) switch contacts, on to the electrical motor circuit operating from the electric power source. The remaining electrical apparatus comprises hard-wired circuitry which provides electrical ground and common polarity.

During normal operation, a machine such as a dishwasher or automatic washing machine rests centered in the containment pedestal. During normal operation of the washer, facility power is routed through the high water level switch apparatus and into the motor of the washing machine. The electrical circuit also provides common and ground poles to the motor of the machine. Thus, what is generally termed the "hot" lead of the electrical circuit is routed through the switch. Should the machine overflow during operation, the water captured in the containment pedestal will rise thus through the float mechanism, breaking the switch contacts. Immediately, power will be removed from the hot lead leading to the machine motor and the apparatus will shut down stopping the overflow of water which is being pumped from or overflowing from the machine's washing chamber.

DETAILED DESCRIPTION OF THE PREFERRED EMBODIMENT

Figure 1:
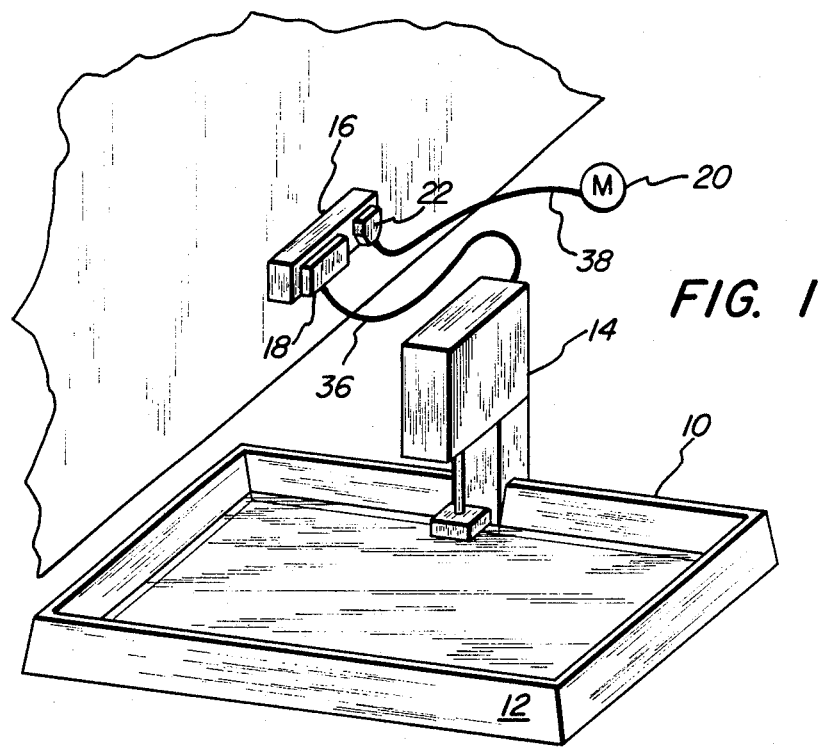
FIG. 1 is an orthographic view of the invention.

The basic invention may be envisaged by referring particularly to FIG. 1. The containment pedestal 10 is essentially a durable rigid tray having elevated sides 12. On one side of the tray there is mounted the float-switch 14 apparatus, herein displayed in slightly exaggerated size. A tri-lead electrical cord 36 connects the float-switch 14 to a stylized 3-prong switch 18 that is plugged into a 3-inline wall plug 16. Plug 18, a male plug, is constructed to span two of the female outlets of wall plug 16. The remaining outlet of wall plug 16 provides power to plug 22 of machine 20. Tri-lead cord 38 is the electrical conduit from plug 22 to machine 20.

Figure 2:
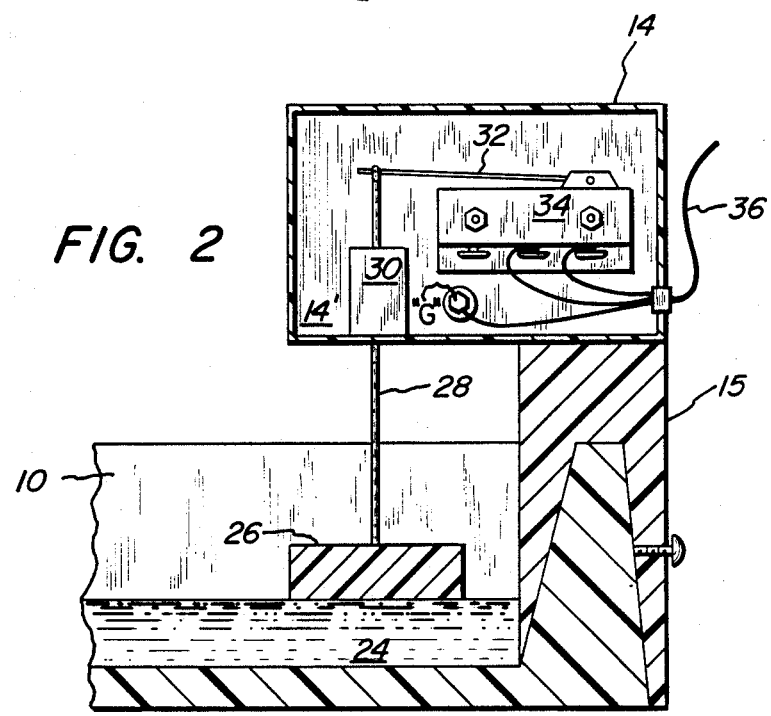
FIG. 2 is a partial cross sectional elevation of the float-switch mounted on the containment pedestal.

FIG. 2, a partial cross sectional elevation of float-switch 14 provides the reader with an understanding of a main component in the high water level detection, power shut-off mechanism of the invention. It must be understood by the reader that machine 20, which represents a dishwasher or automatic washing machine, or the like, is resting inside containment pedestal 10, its four weight-bearing corners situated proximate the four corners of the tray-like pedestal apparatus. For the purposes of clarity, any illustrations of the machine 20 have been left out of the instant drawings.

An actual overflow situation is depicted in FIG. 2 wherein the rising water 24 actuates float-switch mechanism 14 by driving the float 26 upward, the thrust being transmitted through rod 28 which passes through guide 30 to raise lever 32 of switch 34. Switch 34, as will be readily acknowledged by one of ordinary skill, may be either a microswitch rated to the machine 20 electrical requirements or any reasonable configuration of the single-pole, single-throw electrical switch. Electric cord 38 provides three leads as depicted in FIG. 2. One lead which is mounted or bolted to the case 14' is the ground lead and is denoted in FIG. 2 by "G". The remaining two wires comprise but a single hot ("H") line which is either made or broken by the positioning of switch 34. Thus, it may be seen that power is routed into one contact of switch 34 and out of the remaining contact, back to its source. Float-switch 14 is mounted to containment pedestal 10 by any suitable rigidly fixed means, herein support 15 to which case 14' is attached.

Figure 3A:
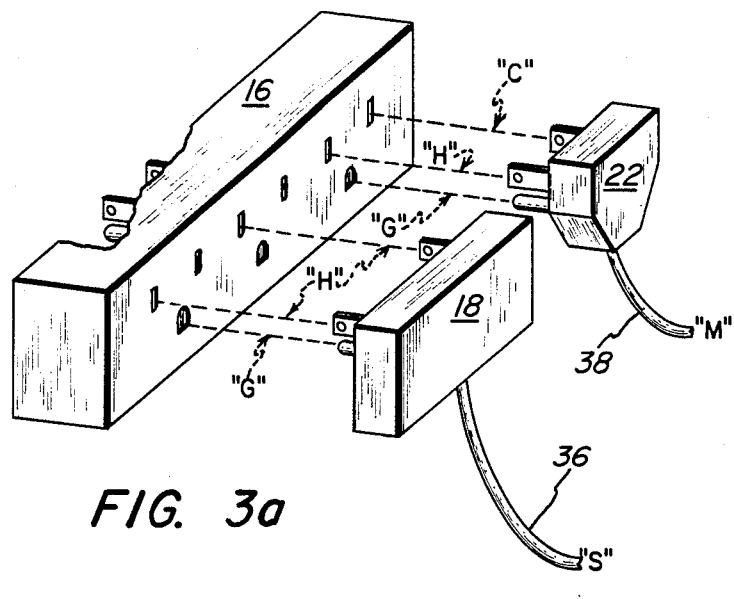
FIG. 3a is an isometric illustration showing the wall outlet, switch plug and machine plug circuit apparatus.

The preferred circuitry is readily mechanized through modification of readily available wall-type and similar apparatus plugs. In FIG. 3a, there is depicted, in isometric illustration, such an arrangement, drawn simply, for the sake of expediency and clarity in illustration. Such an arrangement, however, can be readily achieved with various other elements of circuit design available in the current market place. In this illustration, upper case phonetics are used to depict the following circuit elements; "G", "H", and "C" refer respectively to ground, the hot electrical buss, and the common buss. The upper case phonetics "S" and "M" refer to switch 34 and machine 20, respectively. In the configuration of FIG. 3a, wall plug 16 affords three inline female sockets that have been rewired to the schematic configuration of FIG. 3b. Switch plug 18 spans one full and one partial socket of plug 16 while machine plug 22 is plugged directly into the third remaining female socket. It can be seen from this illustration that both machine plug 22 and switch plug 18 are afforded ground ("G") connections, machine plug 22 is afforded a hot and common lead ("H","C") and switch plug 18 is afforded only the hot lead of two adjacent sockets in plug 16.

Figure 3B:
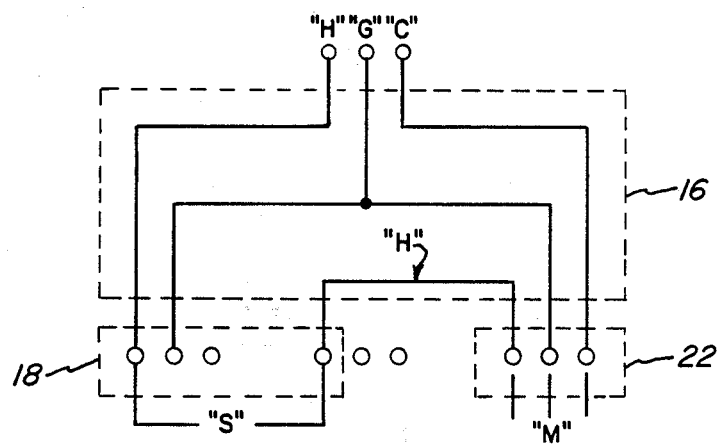
FIG. 3b is a schematic drawing of the FIG. 3a apparatus.

The schematic diagram of FIG. 3b reveals the rationale for the stylized construction seen in FIG. 3a. The reader will note that the ground ("G") lead running from plug 16 does, indeed, service switch plug 18 and machine plug 22. Hot lead ("H") from plug 16 is routed through switch plug 18 to the switch ("S"), back through cord 36 into plug 16 and therethrough to machine plug 22. Thus, the hot ("H") lead is provided to the machine, as is common lead ("C"), with the sole exception being that the hot lead is routed first through float-switch 14. In operation, it can be seen that as long as float 26 remains unelevated and switch 34 remains closed, the hot ("H") circuit will provide power to motor 20, it already being afforded common ("C") connection. Should machine 20 overflow spilling water 24 into containment pedestal 10, switch 34 would be opened, thus depriving machine 20 of its power source, with the consequence that it would shut down and any overflow pumping action would cease.

Another adjunct to the float-switch mechanism has not been depicted herein but may be adequately described and disclosed as an additional microswitch taking its actuation off lever 32. This adjunct apparatus is generally mounted to case 14' and consists of a (series) wired buzzer that is connected to the micro switch 34 and in series with the incoming hot ("H") line of cord 36 and the ground lead ("G") that is tied in to the case 14'. Alternatives to this wiring scheme are to carry an additional lead through cord 36 that is tied to common ("C") of plug 16 or, simply connect the ground side of micro switch 34' to case 14'. Such variations in circuit wiring are well known to those of ordinary skill in the art and will no longer be belabored in this disclosure. Suffice to say, that many adjunct warning, alarming, turn on-off devices may be prepositioned on the containment pedestal 10 to function in a manner similar to that of the float-switch 14.

Figure 4:
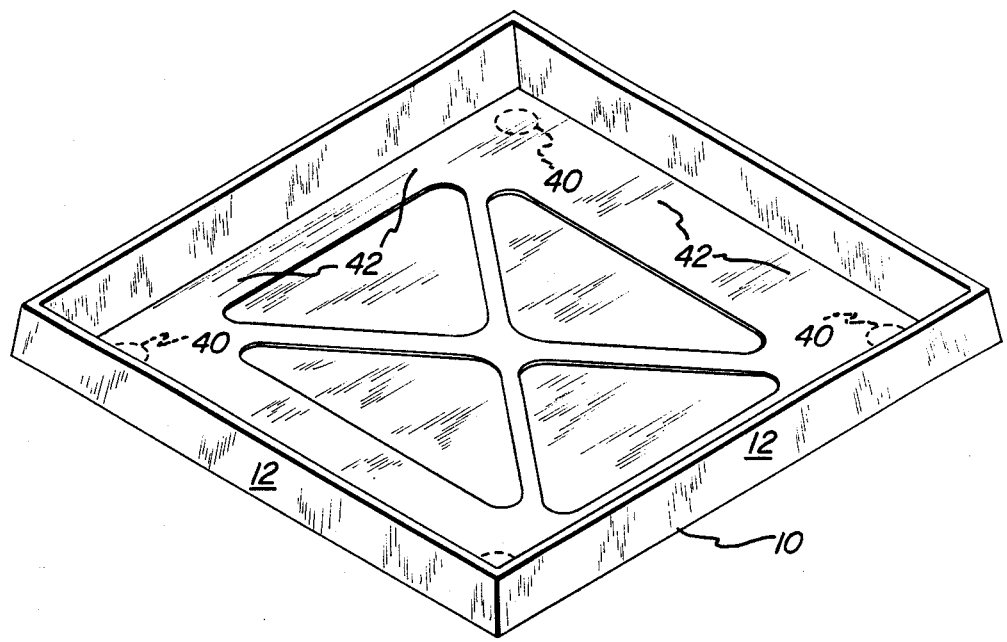
FIG. 4 is a perspective view of the containment pedestal viewed from one corner and above the device.

Finally, FIG. 4 depicts the containment pedestal 10 in perspective so that the reader may obtain an appreciation of the design. FIG. 4 displays a high density, high impact plastic casting 10 of an essentially square-shaped pedestal with elevated sides 12. The central portion has been milled or cast with a debossed portion in the center of the tray, distal the weight-bearing corners of the pedestal. It should be understood that this debossing or milling may be accomplished by casting, chemical milling or machining in order to save weight and concommitant cost. The marginal areas of tray 10, specifically the areas denoted at hard-points 40 are the main weight-bearing portions of the containment pedestal. Likewise, the marginal hard-point areas 42 can also sustain a great amount of weight provided that the base flooring has no appreciable flexibility or uneveness.

Other advantages that may be obtained with the use of this invention shall become apparent through continued practice with the invention. The preceeding discussion, the drawings and any subsequent use of the invention should be interpreted in the broadest sense, such to be limited only by the appended claims.

What is claimed is:

1. The combination of an overflow pedestal-type container with a switch for shutting off electrical power to a washing machine mounted thereon and comprising:

a containment pedestal tray for mounting said machine thereon comprising an essentially quadrilateral base having contiguous elevated sides about the periphery of said base and marginal material hardpoints, said tray adapted to hold liquid overflow from said machine and further comprising a materially diminished area proximate the central area of said base in order to reduce the amount of material required to fabricate said base;

said switch mounted adjacent said tray; said switch, further comprising a sensor-shutoff device, said switch connected to a float, an electrical circuit, and said circuit further comprising a socket plug which feeds hot, common and ground power source inputs to a first discrete hot-ground output and feeds ground and common input to a second discrete ground-common output and also provides an interconnected hot output between said first and said second discrete outputs, a switched plug which connects said switch which is normally closed across the first discrete hot-hot outputs and to the first discrete ground output, and a washing machine plug which connects said motive means to said second discrete ground-common-interconnected hot-outputs, whereby when said switch is opened by said float in response to said water presence, said hot interconnect is broken and power source hot input is removed from said switch and thereby from said motive means, and additional electrical circuitry connecting said switch to an electric power source and further connecting said switch to the washing machine motor, said machine mounted on the pedestal handpoints of said tray; and said float responsive to water overflowing said machine for activating said switch and thereby disconnecting said power source from said switch.

2. The invention of claim 1 wherein said first means further comprises electric alarming means.

3. The invention of claim 2 wherein said alarming means further comprises an electric audio device.

4. The invention of claim 1 wherein said motive means further comprises the motor of said machine which derives its primary motive power from electric power of said source and which is transitioned through said switch.

* * * * *